J. WOOLRIDGE.
Land-Rollers.

No. 135,191.

Patented Jan. 21, 1873.

UNITED STATES PATENT OFFICE.

JOHN WOOLRIDGE, OF DEAN'S CORNERS, ILLINOIS.

IMPROVEMENT IN LAND-ROLLERS.

Specification forming part of Letters Patent No. 135,191, dated January 21, 1873.

*To all whom it may concern:*

Figure 1:
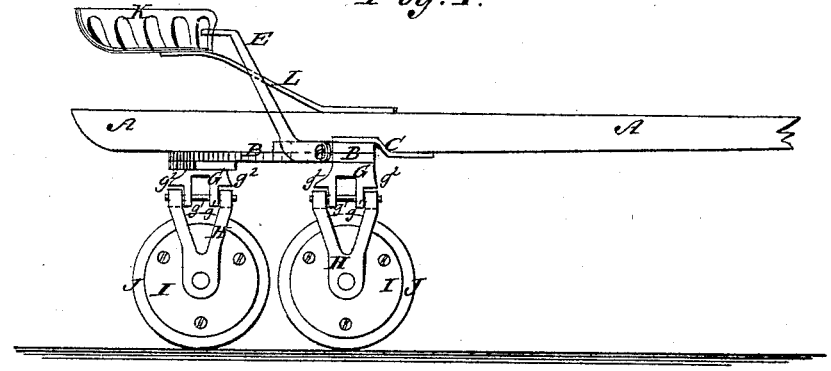
Figure 2:
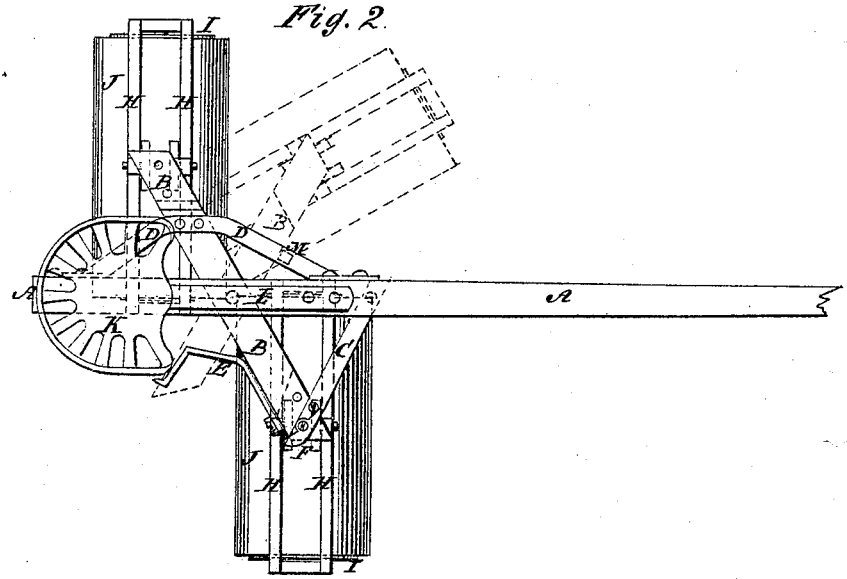
Figure 3:
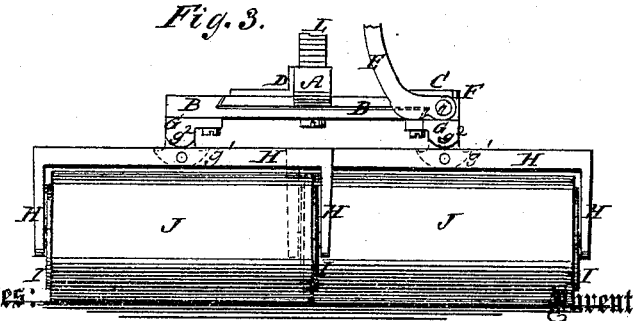

Be it known that I, JOHN WOOLRIDGE, of Dean's Corners, in the county of Lake and State of Illinois, have invented a new and useful Improvement in Land-Roller, of which the following is a specification:

Figure 1 is a side view of my improved land-roller. Fig. 2 is a top view of the same, and showing in dotted lines the position of the rollers when turning. Fig. 3 is a rear view of the same.

Similar letters of reference indicate corresponding parts.

My invention has for its object to furnish an improved land-roller, which shall be so constructed that it will adjust itself to the surface of the land being rolled, which shall be of lighter draft and more readily turned than rollers constructed in the ordinary manner, and which shall at the same time be simple in construction and convenient in use; and it consists in the cross-bar with which the rollers are connected, made in two parts and connected with the tongue, as hereinafter more fully described. It consists, secondly, in the mode of holding the rolls so that they will have a convenient lateral end movement, and in a mode of construction for locking and unlocking automatically the two sections of connecting-bar.

A is the tongue, to the under side of the rear part of which are secured by a bolt the two parts of the cross-bar B. The upper part of the bar B is let into the tongue A, so as to be stationary, and is held securely in place by the braces C D. The bar B is placed in an inclined position, and its ends may be cut or beveled so as to be parallel with the tongue A. The rear end of the brace C is secured to the forward end of the upper part of the bar B, and its forward end is secured to the tongue A. The middle part of the brace D is secured to the rear end of the upper part of the bar B, and its ends are bent or curved inward and are attached to the tongue A. One end of each of the parts of the bar B projects beyond the corresponding end of the other part, and has a beveled shoulder formed upon it to receive the beveled end of the other part. The parts of the bar B are locked in place, when parallel with each other, by the lever E, which is pivoted to the shouldered end of the upper part of the bar B, and which, when moved towards the driver's seat, passes down along the rear edges of said parts. The lever E is kept from moving too far when moved outward to unlock the parts of the bar by a stop, F, attached to said bar B. To the shouldered ends of the two parts of the bar B are attached blocks G, each of which has two downwardly-projecting flanges or wide lugs, $g^1$, upon its bottom, and curved shoulders $g^2$ upon its sides. Through the centers of the lugs or flanges $g^1$ is formed a hole to receive the bolts by which the bars H are pivoted to the said blocks G. The bars H pass along the outer sides of the flanges or lugs $g^1$ and beneath the shoulders $g^2$, the rounding of said shoulders allowing the said bars to rock longitudinally. The bars H extend longitudinally above the rollers, and are bent downwards at right angles at the ends of the rollers. The ends of each pair of bars H are welded together, or otherwise formed solid with each other, and are pivoted to the center of the circular plate I attached to the ends of the rollers J. The circular plates I are made with points or projections upon their inner sides to prevent them from turning or slipping upon the ends of the rollers J. The circular plates I should be almost as large as the ends of the rollers, to serve as a guard to said ends. The rollers J may be stone, hard wood, or iron, and when made of wood, may be made of staves or solid, and should be of such a length that their inner ends will overlap, thus rolling the whole surface of the ground. This construction also enables the land to be rolled close out to the corner, so that no land will be left unrolled. The roller will also roll a ridge or a dead furrow or other hollow as effectively as level ground. The driver's seat K is attached to the upper end of a spring-bar, L, and is so arranged that the driver's weight may nearly balance the weight of the tongue A, so as to relieve the horses' necks. Upon the long brace D of the stationary part of the cross-bar B is secured a stop, M, against which the movable part of the said bar B strikes, to prevent the movable roller from moving so far forward that the forward movement of the machine will not bring it back to its place.

Having thus described my invention, I claim as new and desire to secure by Letters Patent—

1. Two rolls, J J, connected by a two-part bar, B, that is attached to tongue at an oblique angle, and of which the lower section is pivoted, in the manner and for the purpose described.

2. The means described for holding the rolls to each end of bar B so that they may turn laterally in passing over obstructions, consisting of the frames H and blocks G, constructed and pivoted together substantially as set forth.

3. The means described for allowing the pivoted section of bar B to stand still while the roller is being turned at the end of a "land," and yet to be automatically locked by the moving forward of the team, consisting of the obliqued groove and overhanging lip at the outer end of each section of bar B, constructed substantially as specified.

JOHN WOOLRIDGE.

Witnesses:
  W. B. D. GRAY,
  J. D. STEVENS.